US012761752B2

(12) United States Patent
Lee et al.

(10) Patent No.: US 12,761,752 B2
(45) Date of Patent: Oct. 13, 2026

(54) DISPLAY DEVICE WITH DIFFERENT SIGNAL PHASE TO DIFFERENT TRANSMISSION ELECTRODES

(71) Applicant: Samsung Display Co., Ltd., Yongin-si (KR)

(72) Inventors: Bo-Hwan Lee, Yongin-si (KR); Sanghun Park, Yongin-si (KR); Byeongkyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/825,670

(22) Filed: Sep. 5, 2024

(65) Prior Publication Data

US 2025/0103159 A1 Mar. 27, 2025

(30) Foreign Application Priority Data

Sep. 21, 2023 (KR) ........................ 10-2023-0126437

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0416* (2013.01); *G06F 3/0446* (2019.05); *G06F 2203/04112* (2013.01)

(58) Field of Classification Search
CPC .. G06F 3/0412; G06F 3/0416; G06F 3/04166; G06F 3/0446
See application file for complete search history.

(56) References Cited

U.S. PATENT DOCUMENTS

| | | | |
|---|---|---|---|
| 11,531,438 B2 | 12/2022 | Smith et al. | |
| 11,656,715 B2 | 5/2023 | Cho et al. | |
| 11,726,612 B2 | 8/2023 | Choi et al. | |
| 12,008,200 B1 * | 6/2024 | Tan | G06F 3/04184 |
| 2022/0043537 A1 * | 2/2022 | Lee | G06F 3/0446 |
| 2022/0326831 A1 | 10/2022 | Lee et al. | |
| 2023/0004274 A1 * | 1/2023 | Shin | G06F 3/0418 |

FOREIGN PATENT DOCUMENTS

| | | | |
|---|---|---|---|
| KR | 10-1747731 | B1 | 6/2017 |
| KR | 10-2020-0121715 | A | 10/2020 |
| KR | 10-2022-0043999 | A | 4/2022 |
| KR | 10-2022-0099031 | A | 7/2022 |
| KR | 10-2022-0141964 | A | 10/2022 |

* cited by examiner

*Primary Examiner* — Liliana Cerullo
(74) *Attorney, Agent, or Firm* — Womble Bond Dickinson (US) LLP

(57) ABSTRACT

A display device includes a display layer, and a sensor layer having a sensing region and a second sensing region. The sensor layer includes a plurality of first transmission electrodes and a plurality of second transmission electrodes, a first transmission signal having a first waveform and a second transmission signal having a second waveform are provided to the plurality of first transmission electrodes, a third transmission signal having the second waveform and a fourth transmission signal having the first waveform are provided to the plurality of second transmission electrodes, and the first to fourth transmission signals are provided concurrently.

17 Claims, 8 Drawing Sheets

DISPLAY DEVICE WITH DIFFERENT SIGNAL PHASE TO DIFFERENT TRANSMISSION ELECTRODES

CROSS-REFERENCE TO RELATED APPLICATIONS

The present application claims priority to and the benefit of Korean Patent Application No. 10-2023-0126437, filed on Sep. 21, 2023, in the Korean Intellectual Property Office, the entire disclosure of which is incorporated herein by reference.

BACKGROUND

1. Field

Aspects of some embodiments of the present disclosure herein relate to a display device having relatively improved display quality.

2. Description of the Related Art

Various multimedia electronic devices such as televisions, mobile phones, tablet computers, navigation systems, and game consoles may include display devices for displaying images. These electronic devices may be provided with display devices capable of providing a touch-based input mode that enables users to enter information or commands readily, intuitively, and conveniently, in addition to typical input modes such as buttons, keyboards, and mouses.

The above information disclosed in this Background section is only for enhancement of understanding of the background and therefore the information discussed in this Background section does not necessarily constitute prior art.

SUMMARY

Aspects of some embodiments of the present disclosure include a display device having relatively improved display quality.

According to some embodiments of the present disclosure, a display device includes a display layer, and a sensor layer on the display layer and having a sensing region including a first sensing region and a second sensing region adjacent to the first sensing region. According to some embodiments, the sensor layer includes a plurality of first transmission electrodes, each extending in a first direction, spaced apart in a second direction crossing the first direction, and in the first sensing region, and a plurality of second transmission electrodes, each extending in the first direction, spaced apart in the second direction, and in the second sensing region, a first transmission signal having a first waveform is provided to one of the plurality of first transmission electrodes, a second transmission signal having a second waveform that is inverse in phase to the first waveform is provided to another one adjacent to the one of the plurality of first transmission electrodes, a third transmission signal having the second waveform is provided to one of the plurality of second transmission electrodes, a fourth transmission signal having the first waveform is provided to another one adjacent to the one of the plurality of second transmission electrodes, and the first to fourth transmission signals are provided concurrently.

According to some embodiments, the second sensing region may be spaced apart from the first sensing region in the second direction.

According to some embodiments, the sensor layer may include a plurality of first receiving electrodes, each extending in the second direction, spaced apart in the first direction, and located in the first sensing region, and a plurality of second receiving electrodes, each extending in the second direction, spaced apart in the first direction, and located in the second sensing region.

According to some embodiments, the plurality of first receiving electrodes may be electrically insulated from the plurality of second receiving electrodes.

According to some embodiments, the plurality of first receiving electrodes may output a first receiving signal in response to the first transmission signal and the second transmission signal, and the plurality of second receiving electrodes may output a second receiving signal in response to the third transmission signal and the fourth transmission signal.

According to some embodiments, the display device may further include a readout circuit driving the sensor layer, wherein the readout circuit may include a first readout circuit electrically connected to the plurality of first transmission electrodes and a second readout circuit electrically connected to the plurality of second transmission electrodes.

According to some embodiments, the first readout circuit may provide the first transmission signal and the second transmission signal to the plurality of first transmission electrodes, and the second readout circuit may provide the third transmission signal and the fourth transmission signal to the plurality of second transmission electrodes.

According to some embodiments, the first readout circuit may receive the first receiving signal from the plurality of first receiving electrodes, and the second readout circuit may receive the second receiving signal from the plurality of second receiving electrodes.

According to some embodiments, an active region may be defined in the display layer, the first sensing region may overlap a portion of the active region, and the second sensing region may overlap a remaining portion of the active region.

According to some embodiments, a fifth transmission signal, a sixth transmission signal, a seventh transmission signal, and an eighth transmission signal may each concurrently be provided to four adjacent first transmission electrodes among the plurality of first transmission electrodes, and the fifth transmission signal may have the first waveform, and the sixth to eighth transmission signals may have the second waveform.

According to some embodiments, a ninth transmission signal, a tenth transmission signal, an eleventh transmission signal, and a twelfth transmission signal may each concurrently be provided to four adjacent second transmission electrodes among the plurality of second transmission electrodes, the ninth transmission signal may have the second waveform, the tenth to twelfth transmission signals may have the first waveform, and the ninth to twelfth transmission signals may be provided concurrently with the fifth to eighth transmission signals.

According to some embodiments of the present disclosure, a display device includes a display layer, and a sensor layer on the display layer, having a sensing region including a first sensing region and a second sensing region adjacent to the first sensing region, and working on a first sensing frame and a second sensing frame continuous with the first sensing frame. According to some embodiments, the sensor layer includes a plurality of first transmission electrodes, each extending in a first direction, spaced apart in a second direction crossing the first direction, and located in the first sensing region, and a plurality of second transmission electrodes, each extending in the first direction, spaced apart in the second direction, and located in the second sensing region, a first transmission signal is provided to one of the plurality of first transmission electrodes, a second transmission signal is provided to one of the plurality of second transmission electrodes, the first transmission signal includes a first portion having a first waveform and a second portion having a second waveform that is inverse in phase to the first waveform, the second transmission signal includes a third portion having the second waveform and a fourth portion having the first waveform, the first portion and the third portion are provided during the first sensing frame, and the second portion and the fourth portion are provided during the second sensing frame.

According to some embodiments, the second sensing region may be spaced apart from the first sensing region in the second direction.

According to some embodiments, the sensor layer may include a plurality of first receiving electrodes, each extending in the second direction, spaced apart in the first direction, and located in the first sensing region, and a plurality of second receiving electrodes, each extending in the second direction, spaced apart in the first direction, and located in the second sensing region.

According to some embodiments, the plurality of first receiving electrodes may be electrically insulated from the plurality of second receiving electrodes.

According to some embodiments, the display device may further include a readout circuit driving the sensor layer, wherein the readout circuit may include a first readout circuit electrically connected to the plurality of first transmission electrodes and a second readout circuit electrically connected to the plurality of second transmission electrodes.

According to some embodiments, the first readout circuit may provide the first transmission signal to the plurality of first transmission electrodes, and the second readout circuit may provide the second transmission signal to the plurality of second transmission electrodes.

According to some embodiments, a display region may be defined in the display layer, the first sensing region may overlap a portion of the display region, and the second sensing region may overlap a remaining portion of the display region.

According to some embodiments, a fifth transmission signal, a sixth transmission signal, a seventh transmission signal, and an eighth transmission signal may each concurrently be provided to four adjacent first transmission electrodes among the plurality of first transmission electrodes, and the fifth transmission signal may have the first waveform, and the sixth to eighth transmission signals may have the second waveform.

According to some embodiments, a ninth transmission signal, a tenth transmission signal, an eleventh transmission signal, and a twelfth transmission signal may each concurrently be provided to four adjacent second transmission electrodes among the plurality of second transmission electrodes, the ninth transmission signal may have the second waveform, the tenth to twelfth transmission signals may have the first waveform, and the ninth to twelfth transmission signals may be provided concurrently with the fifth to eighth transmission signals.

BRIEF DESCRIPTION OF THE DRAWINGS

The accompanying drawings are included to provide a further understanding of the present disclosure, and are incorporated in and constitute a part of this specification. The drawings illustrate aspects of some embodiments of the present disclosure and, together with the description, serve to explain aspects of some embodiments of the present disclosure. In the drawings.

DETAILED DESCRIPTION

Figure 1:
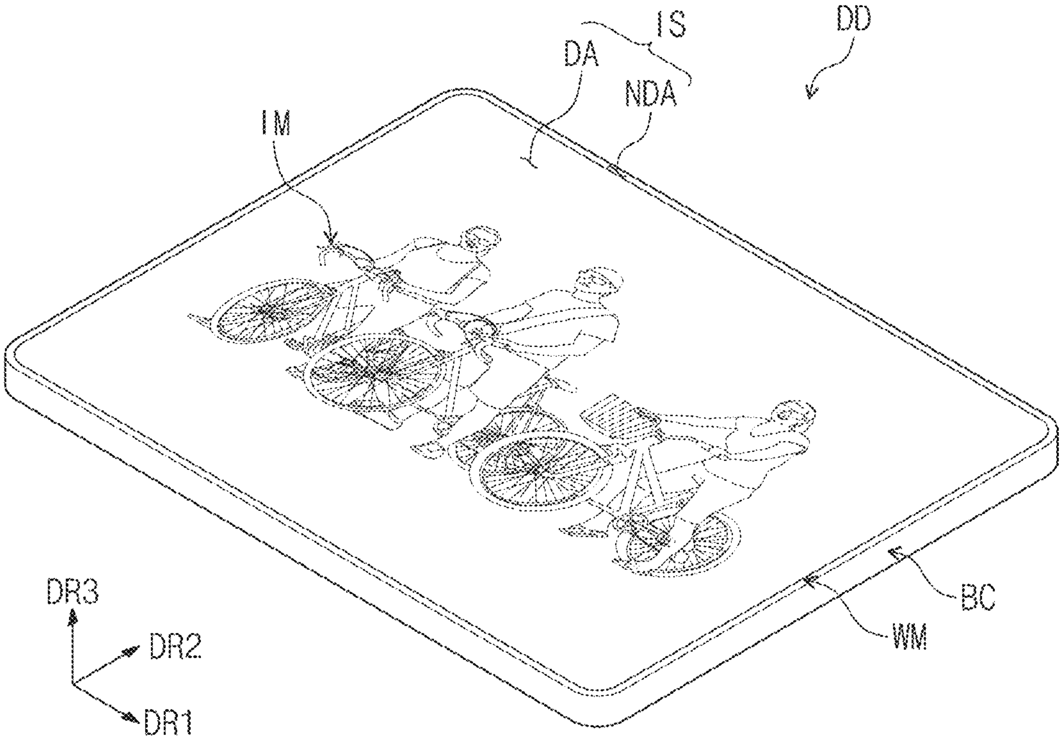
FIG. 1 is a perspective view of a display device according to some embodiments of the present disclosure.

As used herein, when an element (or a region, a layer, a portion, and the like) is referred to as being "on," "connected to," or "bonded to" another element, it means that the element may be directly located on/connected to/bonded to the other element, or that a third element may be located therebetween.

Like reference numerals refer to like elements. In addition, in the drawings, the thickness, the ratio, and the dimensions of elements are exaggerated for an effective description of technical contents. The term "and/or," includes all combinations of one or more of which associated configurations may define.

It will be understood that, although the terms first, second, and the like may be used herein to describe various elements, these elements should not be limited by these terms. These terms are only used to distinguish one element from another element. For example, a first element may be referred to as a second element, and similarly, a second element may be referred to as a first element without departing from the teachings of the present disclosure. The singular forms are intended to include the plural forms as well, unless the context clearly indicates otherwise.

Also, terms of "below", "on lower side", "above", "on upper side", or the like may be used to describe the relationships of the components shown in the drawings. The terms are used as a relative concept and are described with reference to the direction indicated in the drawings.

It should be understood that the terms, "comprise" and "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure pertains. In addition, terms, such as those defined in commonly used dictionaries, should be interpreted as having a meaning that is consistent with their meaning in the context of the relevant art and should not be interpreted in an idealized or overly formal sense unless expressly so defined herein.

Hereinafter, aspects of some embodiments of the present disclosure will be described in more detail with reference to the drawings.

Figure 2:
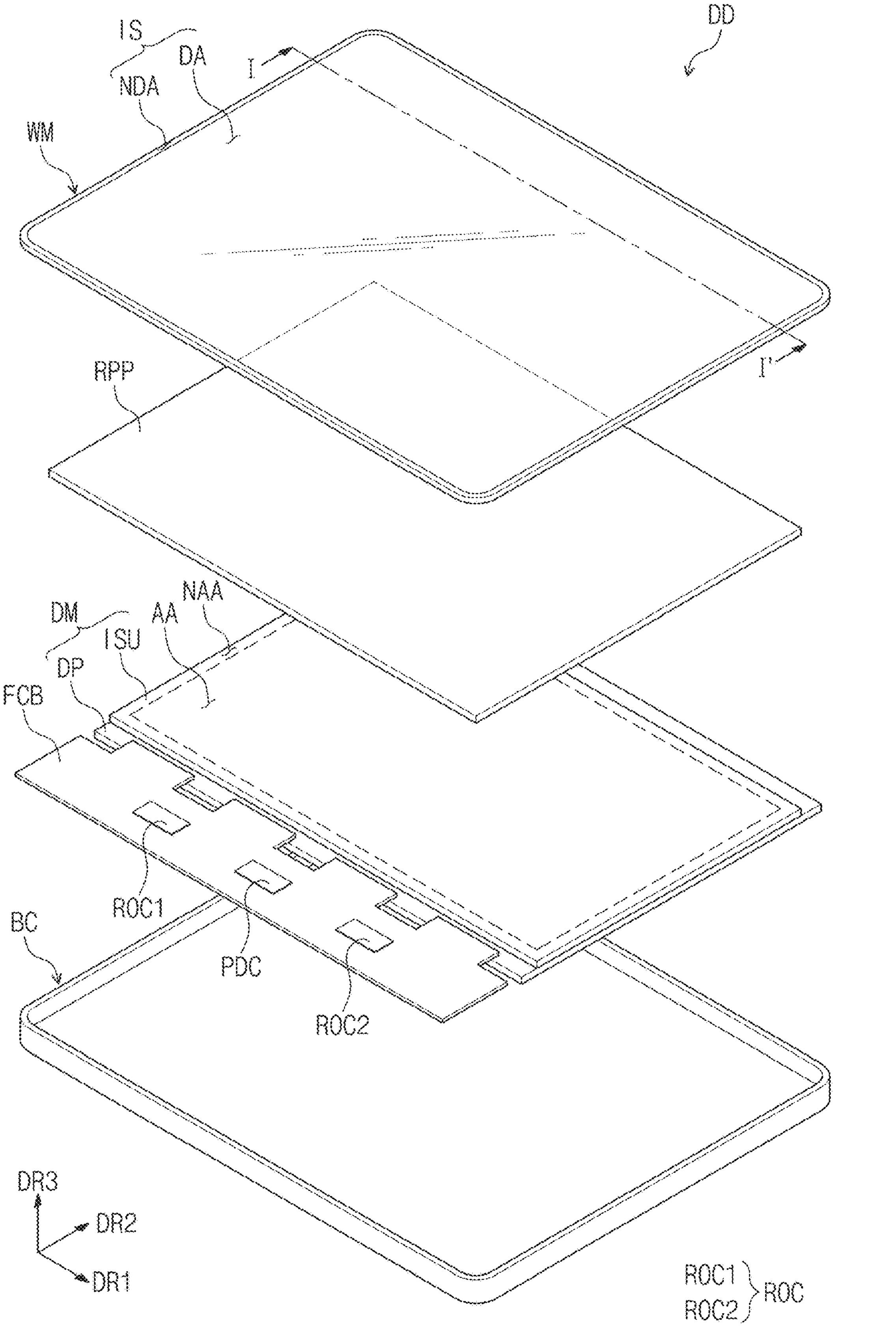
FIG. 2 is an exploded perspective view of a display device according to some embodiments of the present disclosure.

FIG. 1 is a perspective view of a display device according to some embodiments of the present disclosure; FIG. 2 is an exploded perspective view of a display device according to some embodiments of the present disclosure.

Referring to FIGS. 1 and 2, a display device DD may be a device which is activated according to an electrical signal. A display device DD according to some embodiments of the present disclosure may be small- and/or medium-sized display devices, such as mobile phones, tablets, laptop computers, car navigation systems, and game consoles, as well as large-sized display devices, such as televisions and monitors. These are merely presented as an example, and thus embodiments according to the present disclosure may be adopted for other types of display devices without departing from the spirit and scope of embodiments according to the present disclosure. The display device DD may have a rectangular shape having long sides in a first direction DR1 and short sides in a second direction DR2 crossing the first direction DR1. However, the shape of the display device DD is not limited thereto, and the display devices DD may be variously shaped and provided. The display device DD may display an image IM toward a third direction DR3 on a display surface IS parallel to each of the first direction DR1 and the second direction DR2. The display surface IS on which the image IM is displayed may correspond to a front surface of the display device DD.

According to some embodiments, a front surface (or an upper surface) and a rear surface (or a lower surface) of respective members may be defined with respect to a direction in which the image IM is displayed. The front and rear surfaces may oppose each other in the third direction DR3 and a normal direction of each of the front and rear surfaces may be parallel to the third direction DR3.

A distance between the front surface and the rear surface in the third direction DR3 may correspond to a thickness in the third direction DR3 of the display device DD. Meanwhile, directions indicated by the first to third directions DR1, DR2, and DR3 are relative concepts, and may thus be changed to other directions.

The display device DD may detect external inputs applied from the outside. The external inputs may include various forms of inputs provided from outside the display device DD. The display device DD according to some embodiments of the present disclosure may detect user inputs applied from the outside. The user inputs may be any one among various types of external inputs such as a body part of users, light, heat, gaze, or pressure, or a combination thereof. In addition, the display device DD may also detect the external user inputs applied to a side surface or a rear surface of the display device DD depending on a structure of the display device DD, and is not limited to any one embodiment. For example, the external input may include inputs through an input device (e.g., stylus pen, active pen, touch pen, electronic pen, e-pen, and the like).

The display surface IS of the display device DD may be divided into a display region DA and a non-display region NDA. The display region DA may be a region in which the image IM is displayed. Users may view the image IM through the display region DA. According to some embodiments, the display region DA may be shown in a rectangular shape with vertices rounded. However, this is presented as an example, and the display region DA may be variously shaped and is not limited to any one embodiment.

The non-display region NDA may be adjacent to (e.g., in a periphery or outside a footprint of) the display region DA. The non-display region NDA may have a color (e.g., a set or predetermined color). The non-display region NDA may surround the display region DA. Accordingly, the shape of the display region DA may be defined substantially by the non-display region NDA. However, this is presented as an example, and the non-display region NDA may be located adjacent to only one side of the display region DA, or may not be provided. The display device DD according to some embodiments of the present disclosure may include various embodiments, and is not limited to any one embodiment.

The display device DD may include a display module DM, and a window WM located on the display module DM. The display module DM may include a display layer DP and a sensor layer ISU.

The display layer DP according to some embodiments of the present disclosure may be a light emitting display panel. For example, the display layer DP may be an organic light emitting display panel, an inorganic light emitting display panel, or a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include quantum dots, quantum rods, and the like. Hereinafter, in the present embodiments, the display panel DP is described as an organic light emitting display panel.

The display layer DP may output the image IM, and the output image IM may be displayed through the display surface IS.

The sensor layer ISU may be located on the display layer DP and may detect external inputs. The sensor layer ISU may be directly located on the display layer DP. According to some embodiments of the present disclosure, the sensor layer ISU may be formed on the display layer DP through a roll-to-roll process. That is, when the sensor layer ISU is directly located on the display layer DP, an internal adhesive film is not located between the sensor layer ISU and the display layer DP. However, the internal adhesive film may be located between the sensor layer ISU and the display layer DP. In this case, the sensor layer ISU is not prepared along with the display layer DP through a roll-to-roll process, and after being prepared through a separate process from the display layer DP, the sensor layer ISU may be fixed on an upper surface of the display layer DP through the internal adhesive film.

The window WM may be formed of a transparent material capable of emitting the image IM. For example, the window WM may be formed of glass, sapphire, plastic, and the like. The window WM is shown as a single layer, but is not limited thereto and may include a plurality of layers.

According to some embodiments, the non-display region NDA of the display device DD described above may be provided as a region in which substantially a material including a color (e.g., a set or predetermined color) is printed on one region of the window WM. According to some embodiments of the present disclosure, the window WM may include a light blocking pattern to define the non-display region NDA. The light blocking pattern may be a colored organic film and may be formed, for example, through a coating method.

The window WM may be bonded to the display module DM through an adhesive film. According to some embodiments of the present disclosure, the adhesive film may include an optically clear adhesive film (OCA). However, the adhesive film is not limited to thereto and may include typical adhesives or gluing agents. For example, the adhesive film may include an optically clear resin (OCR) or a pressure sensitive adhesive film (PSA).

An anti-reflection panel RPP may be further located between the window WM and the display module DM. The anti-reflection panel RPP relatively reduces reflectance of external light incident from an upper side of the window WM. An anti-reflection panel RPP according to some embodiments of the present disclosure may include a retarder and a polarizer. According to some embodiments, the anti-reflection panel RPP may include color filters. The arrangement of the color filters may be determined considering the colors of light generated by a plurality of pixels PX (see FIG. 5) included in the display layer DP. The anti-reflection panel RPP may further include a light blocking pattern. According to some embodiments of the present disclosure, the anti-reflection panel RPP may not be provided or may be embedded in the display module DM.

The display module DM may display the image IM according to electrical signals and transmit/receive information on external inputs. The display module DM may be defined as an active region AA and a peripheral region NAA. The active region AA may be defined as a region for outputting the image IM provided from the display module DM. In addition, the active region AA may be defined as a region in which the sensor layer ISU detects external inputs applied from the outside.

The peripheral region NAA is adjacent to the active region AA. For example, the peripheral region NAA may surround the active region AA. However, this is presented as an example, and the peripheral region NAA may be defined in various shapes, and is not limited to any one embodiment. According to some embodiments, the active region AA of the display module DM may correspond to at least a portion of the display region DA.

The display module DM may further include a circuit board FCB. The circuit board FCB may be a flexible printed circuit board. The circuit board FCB may be electrically connected to the display layer DP. The circuit board FCB may include a plurality of driving elements. The plurality of driving elements may include a panel driving circuit PDC for driving the display layer DP and a readout circuit ROC for driving the sensor layer ISU. The readout circuit ROC may include a first readout circuit ROC1 driving a portion of the sensor layer ISU and a second readout circuit ROC2 driving the remainder of the sensor layer ISU. For example, the first readout circuit ROC1 may drive the first sensing region SA1 (see FIG. 6), and the second readout circuit ROC2 may drive the second sensing region SA2 (see FIG. 6).

The panel driving circuit PDC may be electrically connected to the display layer DP through the circuit board FCB, and the readout circuit ROC may be electrically connected to the sensor layer ISU through the circuit board FCB.

According to some embodiments, the sensor layer ISU and readout circuit ROC may be input detection devices. The sensor layer ISU and the readout circuit ROC will be described in detail later.

The display device DD further includes an outer case BC accommodating the display module DM. The outer case BC may be bonded to the window WM to define an outer portion of the display device DD. The outer case BC absorbs shocks applied from the outside and prevents or reduces instances of contaminants or foreign substances/moisture entering into the display module DM to protect components received in the outer case BC. Meanwhile, according to some embodiments of the present disclosure, the outer case BC may be provided in a form in which a plurality of storage members are bonded.

The display device DD according to some embodiments may further include an electronic module including various functional modules for operating the display module DM, a power supply module (e.g., Battery) for supplying power required for the overall operation of the display device DD, and a bracket bonded to the display module DM and/or the outer case BC to divide an internal space of the display device DD.

Figure 3:
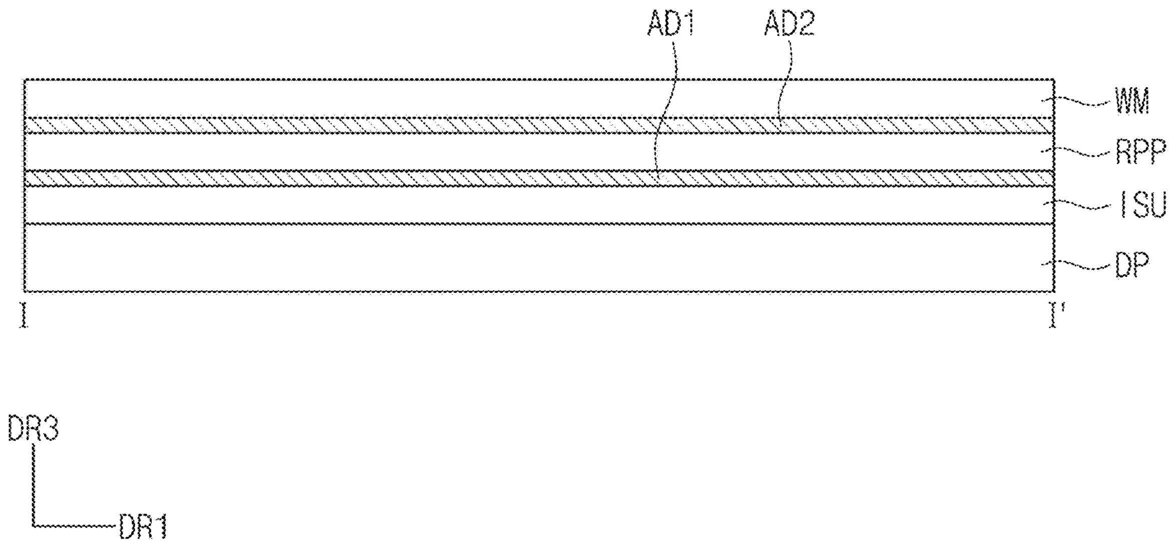
FIG. 3 is a cross-sectional view taken along the line I-I' of FIG. 2.

FIG. 3 is a cross-sectional view taken along the line I-I' of FIG. 2.

In FIG. 3, components of the display device DD are shown briefly to describe a stack relationship thereof.

Referring to FIG. 3, the display device DD may include a display layer DP, a sensor layer ISU, an anti-reflection panel RPP, and a window WM. At least some components of the display layer DP, the sensor layer ISU, the anti-reflection panel RPP, and the window WM may be formed through a roll-to-roll process, or at least some components thereof may be bonded through an adhesive member. For example, the sensor layer ISU and the anti-reflection panel RPP may be bonded through an adhesive member AD1. The anti-reflection panel RPP and the window WM may be bonded through an adhesive member AD2.

The adhesive members AD1 and AD2 may be a pressure sensitive adhesive film (PSA), or a transparent adhesive member such as an optically clear adhesive film (OCA) or an optically clear resin (OCR). The adhesive member, which will described later may include a general adhesive or a gluing agent. According to some embodiments of the present disclosure, the anti-reflection panel RPP and the window WM may be replaced with other components or may not be provided.

The display layer DP and the sensor layer ISU formed through a roll-to-roll process are located directly on the display layer DP. Herein, "a component B is located directly on a component A" indicates that there is no separate adhesive layer/adhesive member between the component A and the component B. After the component A is formed, the component B is formed on a base surface provided by the component A through a roll-to-roll process.

According to some embodiments, the anti-reflection panel RPP and the window WM may be a "panel" type, and the sensor layer ISU may be a "layer" type. The "panel" type includes a base layer providing a base surface, such as a synthetic resin film, a composite material film, and a glass substrate, but the "layer" type may not have the base layer. That is, the "layer" type components are located on the base surface provided by other components. According to some embodiments of the present disclosure, the anti-reflection panel RPP and the window WM may be the "layer" type.

The display layer DP generates the image IM (see FIG. 1), and the sensor layer ISU acquires coordinate information of external inputs (e.g., a touch event). According to some embodiments, the display device DD according to some embodiments of the present disclosure may further include a protection member located on a lower surface (a rear surface) of the display panel DP. The protection member and the display panel DP may be bonded through an adhesive member.

The anti-reflection panel RPP relatively reduces reflectance of external light incident from an upper side of the window WM. The anti-reflection panel RPP according to some embodiments of the present disclosure may include a retarder and a polarizer. The retarder may be a film type or a liquid crystal coating type. The polarizer may also be a film type or a liquid crystal coating type. The film type may include an elongated synthetic resin film, and the liquid crystal coating type may include liquid crystals arranged in an arrangement (e.g., a set or predetermined arrangement). The phase retarder and the polarizer may further include protection films. The retarder and the polarizer themselves or the protection films may be defined as a base layer of the anti-reflection panel RPP.

The anti-reflection panel RPP according to some embodiments of the present disclosure may include color filters. The color filters have an arrangement (e.g., a set or predetermined arrangement). Considering light emitting colors of pixels included in the display layer DP, the arrangement of the color filters may be determined. The anti-reflection panel RPP may further include a black matrix positioned adjacent to the color filters.

The anti-reflection panel RPP according to some embodiments of the present disclosure may include a destructive interference structure. For example, the destructive interference structure may include a first reflection layer and a second reflection layer located on different layers. First refection light and second refection light, which are reflected respectively from the first refection layer and the second refection layer, may destructively interfere with each other, thereby relatively reducing reflectance of the external light.

The window WM according to some embodiments of the present disclosure may include a glass substrate and/or a synthetic resin film. The window WM is not limited to a single layer. The window WM may include two or more films bonded through an adhesive member. Although not separately shown, the window WM may further include a functional coating layer. The functional coating layer may include an anti-fingerprint layer, an anti-reflection layer, and a hard coating layer.

Figure 4:
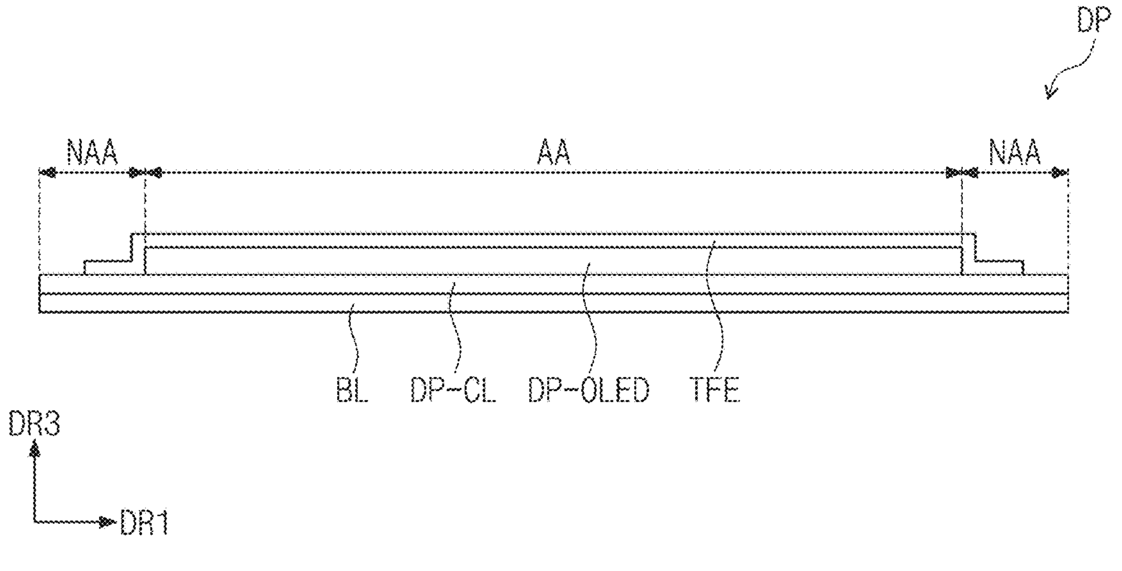
FIG. 4 is a cross-sectional view showing components of a display layer according to some embodiments of the present disclosure.

FIG. 4 is a cross-sectional view showing components of a display layer according to some embodiments of the present disclosure.

Referring to FIG. 4, the display layer DP includes a base layer BL, a circuit element layer DP-CL, a light emitting element layer DP-OLED, and a thin film encapsulation layer TFE. The active region AA and the peripheral region NAA corresponding to the display region DA (see FIG. 1) and the non-display region NDA (see FIG. 1), respectively, may be defined in the display layer DP. Herein, "a region/portion corresponds to another region/portion" indicates that "the regions/portions overlap each other", but is not limited to having the same surface area and/or having the same shape.

The base layer BL may include at least one synthetic resin film. The base layer BL may include a glass substrate, a metal substrate, an organic/inorganic composite material substrate, or the like.

The circuit element layer DP-CL is located on the base layer BL. The circuit element layer DP-CL include at least one insulating layer and circuit elements. The insulating layer include at least one inorganic layer and at least one organic layer. The circuit elements may include signal lines, a pixel driving circuit, or the like.

The light emitting element layer DP-OLED is located on the circuit element layer DP-CL. The light emitting element layer DP-OLED may include a plurality of organic light emitting diodes. The light emitting element layer DP-OLED may further include an organic layer such as a pixel defining film.

The thin film encapsulation layer TFE may be located on the light emitting element layer DP-OLED to seal the light emitting element layer DP-OLED. The thin film encapsulation layer TFE may entirely cover the active region AA. The thin film encapsulation layer TFE may cover a portion of the peripheral region NAA.

The thin film encapsulation layer TFE includes a plurality of thin films. Some thin films are arranged to relatively improve optical efficiency, and other thin films are arranged to protect the organic light emitting diodes.

Figure 5:
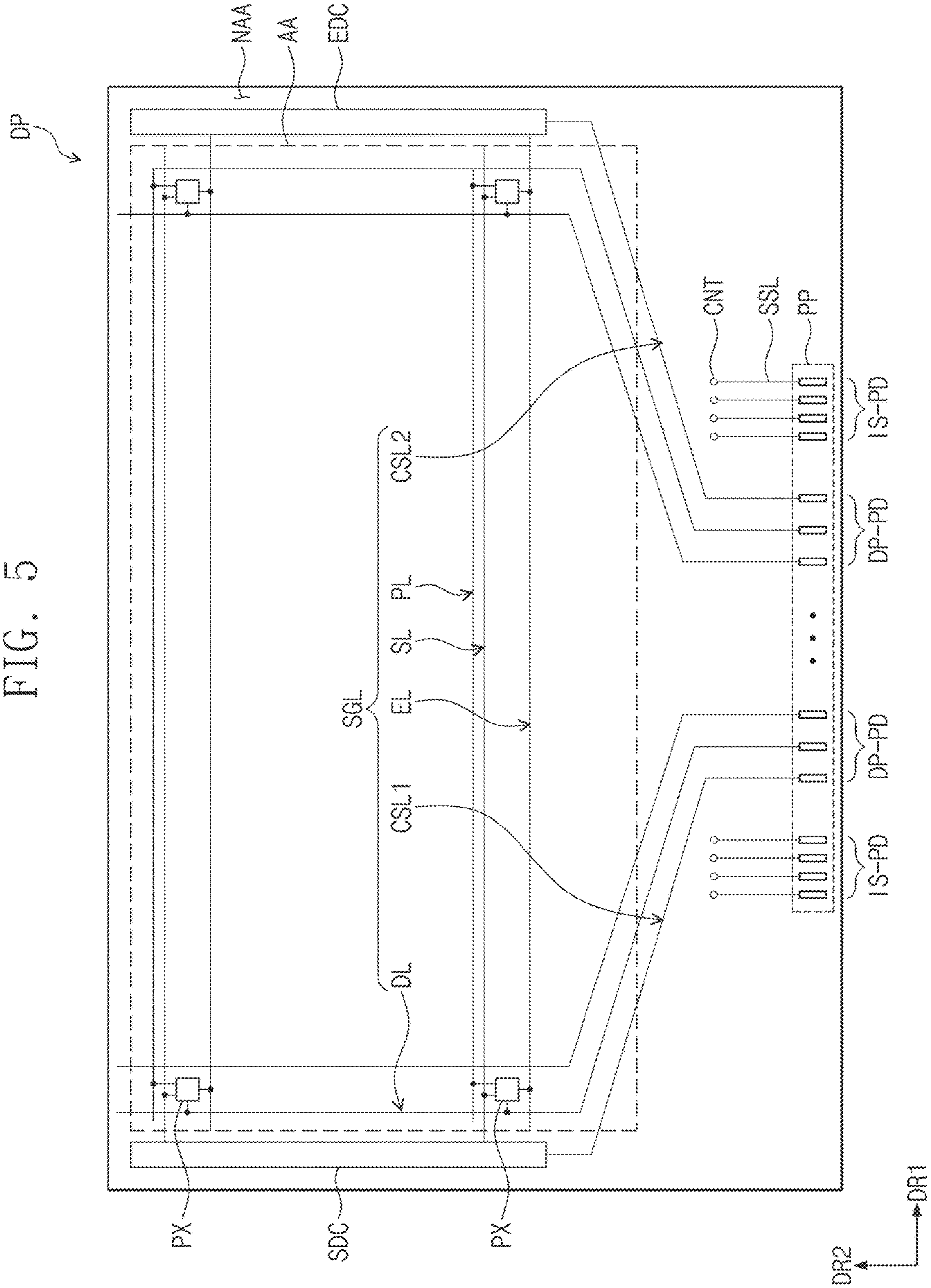
FIG. 5 is a plan view showing components of a display layer according to some embodiments of the present disclosure.

FIG. 5 is a plan view showing components of a display layer according to some embodiments of the present disclosure.

Referring to FIG. 5, the display layer DP may include a scan driving circuit SDC, a light emitting driving circuit EDC, a plurality of signal lines SGL, and a plurality of pixels PX.

The scan driving circuit SDC generates a plurality of scan signals and sequentially outputs the plurality of scan signals to a plurality of scan lines SL which will be described later.

The light emitting driving circuit EDC generates a plurality of light emitting control signals and sequentially outputs the plurality of light emitting control signals to a plurality of light emitting control lines EL which will be described later.

According to some embodiments, the scan driving circuit SDC and the light emitting driving circuit EDC may be electrically connected to the panel driving circuit PDC (see FIG. 2). The scan driving circuit SDC and the light emitting driving circuit EDC may work under the control of the panel driving circuit PDC (see FIG. 2).

The scan driving circuit SDC and the light emitting driving circuit EDC may include a plurality of transistors formed through the same process as a plurality of transistors in the plurality of pixels PX.

The plurality of signal lines SGL include a scan line SL, a data line DL, a power line PL, a light emitting control line EL, and control signal lines CSL1 and CSL2. The scan line SL, the data line DL, and the light emitting control line EL are each connected to a corresponding pixel PX among the plurality of pixels PX. The power line PL is connected to the pixels PX in common. The control signal line CSL1 may provide the scan driving circuit SDC with control signals. The control signal line CSL2 may provide the light emitting driving circuit EDC with control signals. The power line PL may provide a voltage required for the operation of the plurality of pixels PX. The power line PL may include a plurality of lines that provide different voltages.

According to some embodiments, the plurality of signal lines SGL may further include a plurality of auxiliary lines SSL. According to some embodiments of the present disclosure, the plurality of auxiliary lines SSL may not be provided. The plurality of auxiliary lines SSL may each be connected to contact holes CNT. The plurality of auxiliary lines SSL may be connected to signal lines of the sensor layer ISU (see FIG. 6) which will be described later through the contact holes CNT.

The display layer DP may include a pad region PP. A plurality of display pads DP-PD and a plurality of sensor pads IS-PD may be located in the pad region PP of the display layer DP. The plurality of display pads DP-PD and the plurality of sensor pads IS-PD may include a plurality of data lines DL, a power line PL, a plurality of display pads DP-PD connected to a plurality of control signal lines CSL1 and CSL2, and a plurality of sensor pads IS-PD connected to a plurality of auxiliary lines SSL. The plurality of display pads DP-PD and the plurality of sensor pads IS-PD are located adjacent to each other in the pad region PP defined in a portion of the peripheral region NAA. Stack structures or constituents of the plurality of display pads DP-PD and the plurality of sensor pads IS-PD may not be distinguished and formed through the same process. The plurality of display pads DP-PD and the plurality of sensor pads IS-PD may be electrically connected to the circuit board FCB (see FIG. 2).

The active region AA may be defined as a region in which the pixels PX are located. In the active region AA, a plurality of electronic elements are located. The electronic elements include an organic light emitting diode provided in each of the pixels PX and a pixel driving circuit connected thereto. The scan driving circuit SDC, the light emitting driving circuit EDC, the plurality of signal lines SGL, the plurality of display pads DP-PD, the plurality of sensor pads IS-PD, and a pixel driving circuit may be included in the circuit element layer DP-CL (see FIG. 4).

According to some embodiments, the plurality of pixels PX may each include a plurality of transistors, a capacitor, and an organic light emitting diode. The plurality of pixels PX emit light in response to signals received through the plurality of scan lines SL, the plurality of data lines DL, the plurality of light emitting control lines EL, and the power line PL.

According to some embodiments, the display layer DP may further include a data driving circuit. According to some embodiments, the data driving circuit may be located between the active region AA and the pad region PP. The data driving circuit may be electrically connected to the pixels PX through the data lines DL and may provide the data signals to the pixels PX. According to some embodiments, the data driving circuit may be located on the circuit board FCB (see FIG. 2).

Figure 6:
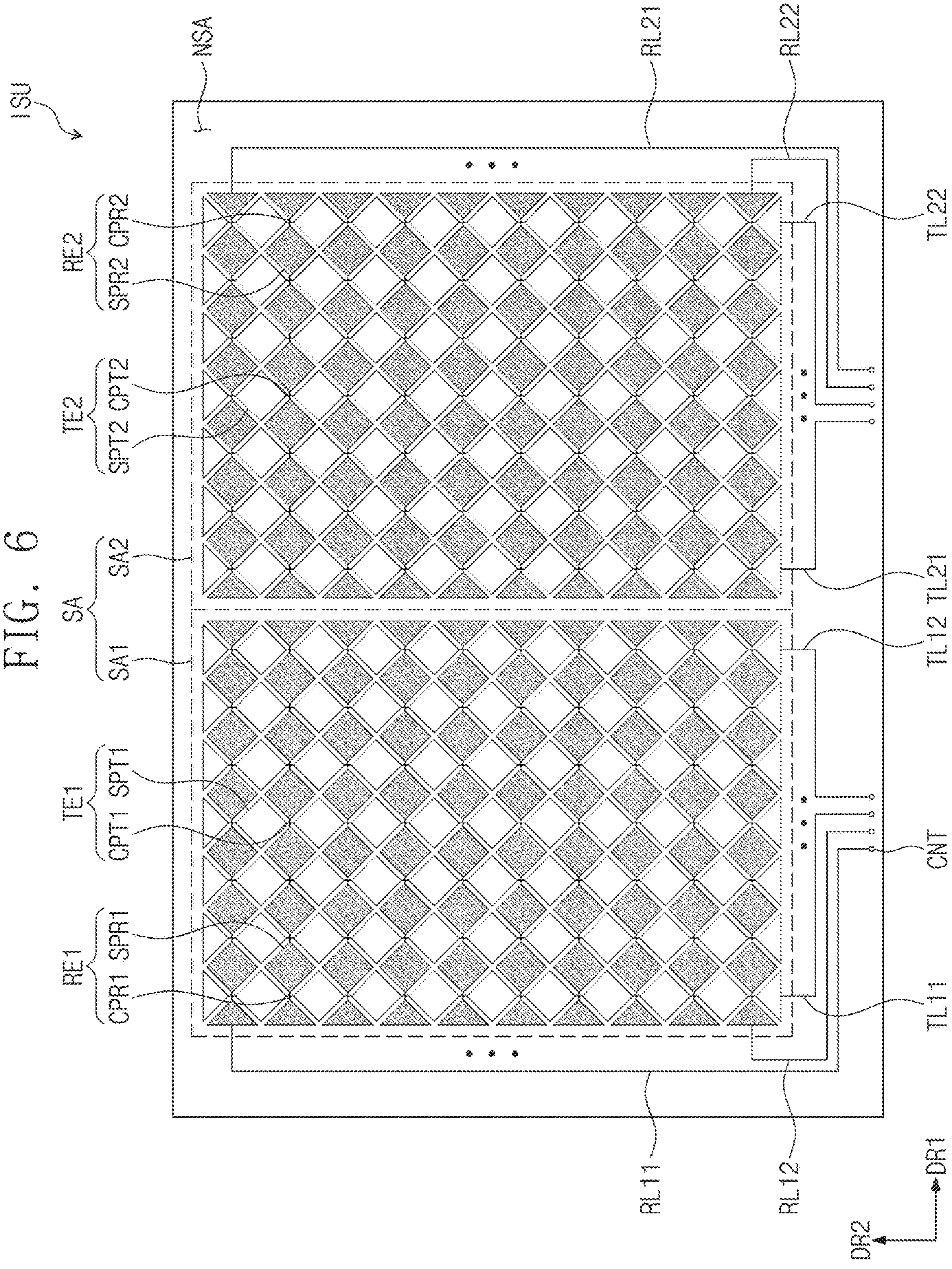
FIG. 6 is a plan view showing components of a sensor layer according to some embodiments of the present disclosure.

FIG. 6 is a plan view showing components of a sensor layer according to some embodiments of the present disclosure.

Referring to FIG. 6, the sensor layer ISU may include a sensing region SA and a non-sensing region NSA. The sensing region SA may include a first sensing region SA1 and a second sensing region SA2 adjacent to the first sensing region SA1. The second sensing region SA2 may be a region spaced apart from the first sensing region SA1 in the first direction DR1. For example, the first sensing region SA1 and the second sensing region SA2 may be adjacent to each other.

The sensing region SA may be a region activated according to electrical signals. For example, the sensing region SA may be a region detecting inputs. The non-sensing region NSA may surround the sensing region SA. The sensing region SA may correspond to the active region AA (see FIG. 5), and the non-sensing region NSA may correspond to the peripheral region NAA (see FIG. 5). The first sensing region SA1 may overlap a portion of the active region AA (see FIG. 5), and the second sensing region SA2 may overlap the remainder of the active region AA (see FIG. 5).

The sensor layer ISU may include a plurality of first transmission electrodes TE1, a plurality of first receiving electrodes RE1, a plurality of second transmission electrodes TE2, and a plurality of second receiving electrodes RE2. The plurality of first transmission electrodes TE1 and the plurality of first receiving electrodes RE1 may be located in the first sensing region SA1. The plurality of second transmission electrodes TE2 and the plurality of second receiving electrodes RE2 may be located in the second sensing region SA2.

The sensor layer ISU may further include a ground electrode located at a border region between the first sensing region SA1 and the second sensing region SA2. In this case, the first sensing region SA1 and the second sensing region SA2 may be electrically insulated.

The plurality of first transmission electrodes TE1 and the plurality of first receiving electrodes RE1 may be electrically insulated from each other and cross each other in the first sensing region SA1, and the plurality of second transmission electrodes TE2 and the plurality of second receiving electrodes RE2 may be electrically insulated from each other and cross each other in the second sensing region SA2.

The plurality of first transmission electrodes TE1 may each extend along the second direction DR2, and the plurality of first transmission electrodes TE1 may be arranged along the first direction DR1. The plurality of first transmission electrodes TE1 may each include a plurality of first transmission patterns SPT1 and a plurality of first transmission connection patterns CPT1. The plurality of first transmission connection patterns CPT1 may each electrically connect two adjacent first transmission patterns SPT1. The plurality of first transmission patterns SPT1 and the plurality of first transmission connection patterns CPT1 may have a mesh structure.

The plurality of first receiving electrodes RE1 may each extend along the first direction DR1 and the plurality of first receiving electrodes RE1 may be arranged along the second direction DR2. The plurality of first receiving electrodes RE1 may each include a plurality of first receiving patterns SPR1 and a plurality of first receiving connection patterns CPR1. The plurality of first receiving connection patterns CPR1 may each electrically connect two adjacent first receiving patterns SPR1. The plurality of first receiving patterns SPR1 and the plurality of first receiving connection patterns CPR1 may have a mesh structure.

The plurality of second transmission electrodes TE2 may each extend along the second direction DR2, and the plurality of second transmission electrodes TE2 may be arranged along the first direction DR1. The plurality of second transmission electrodes TE2 may each include a plurality of second transmission patterns SPT2 and a plurality of second transmission connection patterns CPT2. The plurality of second transmission connection patterns CPT2 may each electrically connect two adjacent second transmission patterns SPT2. The plurality of second transmission patterns SPT2 and the plurality of second transmission connection patterns CPT2 may have a mesh structure.

The plurality of second receiving electrodes RE2 may each extend along the first direction DR1 and the plurality of second receiving electrodes RE2 may be arranged along the second direction DR2. The plurality of second receiving electrodes RE2 may be arranged to be spaced apart from the plurality of first receiving electrodes RE1 in the first direction DR1. That is, the plurality of first receiving electrodes RE1 may be electrically insulated from the plurality of second receiving electrodes RE2. The plurality of second receiving electrodes RE2 may each include a plurality of second receiving patterns SPR2 and a plurality of second receiving connection patterns CPR2. The plurality of second receiving connection patterns CPR2 may each electrically connect two adjacent second receiving patterns SPR2. The plurality of second receiving patterns SPR2 and the plurality of second receiving connection patterns CPR2 may have a mesh structure.

The plurality of first transmission connection patterns CPT1 may be located on a different layer from the plurality of first receiving connection patterns CPR1. The plurality of first receiving connection patterns CPR1 may be insulated from the plurality of first transmission electrodes TE1 and cross the plurality of first transmission electrodes TE1. For example, the plurality of first transmission connection patterns CPT1 may each be insulated from the plurality of first receiving connection patterns CPR1 and cross the plurality of first receiving connection patterns CPR1.

The plurality of second transmission connection patterns CPT2 may be located on a different layer from the plurality of second receiving connection patterns CPR2. The plurality of second receiving connection patterns CPR2 may be insulated from the plurality of second transmission electrodes TE2 and cross the plurality of second transmission electrodes TE2. For example, the plurality of second transmission connection patterns CPT2 may each be insulated from the plurality of second receiving connection patterns CPR2 and cross the plurality of second receiving connection patterns CPR2.

In FIG. 6, the plurality of first transmission electrodes TE1, the plurality of first receiving electrodes RE1, the plurality of second transmission electrodes TE2, and the plurality of second receiving electrodes RE2 are shown to have a square shape, but the embodiments of the present disclosure are not limited thereto. For example, the plurality of first transmission electrodes TE1, the plurality of first receiving electrodes RE1, the plurality of second transmission electrodes TE2, and the plurality of second receiving electrodes RE2 may have a polygonal shape.

The number of the plurality of first transmission electrodes TE1, the plurality of first receiving electrodes RE1, the plurality of second transmission electrodes TE2, and the plurality of second receiving electrodes RE2 may each vary and change. In FIG. 6, the number of the plurality of first transmission electrodes TE1 and the plurality of second transmission electrodes TE2 is shown to be greater than the number of the plurality of first receiving electrodes RE1 and the plurality of second receiving electrodes RE2, but according to some embodiments, the number of the plurality of first transmission electrodes TE1 and the plurality of second transmission electrodes TE2 may be less than or equal to the number of the plurality of first receiving electrodes RE1 and the plurality of second receiving electrodes RE2.

The plurality of first transmission electrodes TE1, the plurality of first receiving electrodes RE1, the plurality of second transmission electrodes TE2, and the plurality of second receiving electrodes RE2 may include conductive materials. For example, the conductive materials may include metals or alloys thereof. The metals may be, for example, gold (Au), silver (Ag), aluminum (Al), molybdenum (Mo), chromium (Cr), titanium (Ti), nickel (Ni), neodymium (Nd), copper (Cu), and platinum (Pt). However, this is presented as an example, and the plurality of first transmission electrodes TE1, the plurality of first receiving electrodes RE1, the plurality of second transmission electrodes TE2, and the plurality of second receiving electrodes RE2 may be formed of transparent conductive materials. The transparent conductive materials may be silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotubes, graphene, and the like. The plurality of first transmission electrodes TE1, the plurality of first receiving electrodes RE1, the plurality of second transmission electrodes TE2, and the plurality of second receiving electrodes RE2 may be formed of a single layer or multiple layers.

Depending on the operation mode, the plurality of first transmission electrodes TE1 and the plurality of second transmission electrodes TE2 may work as transmission electrodes as well as receiving electrodes, and the plurality of first receiving electrodes RE1 and the plurality of second receiving electrodes RE2 may work as receiving electrodes as well as transmission electrodes.

The sensor layer ISU may obtain position information about external inputs through changes in mutual capacitance between the plurality of first transmission electrodes TE1 and the plurality of first receiving electrodes RE1, and changes in mutual capacitance between the plurality of second transmission electrodes TE2 and the plurality of second receiving electrodes RE2.

The sensor layer ISU may further include first transmission lines TL11 and TL12, second transmission lines TL21 and TL22, first receiving lines RL11 and RL12, and second receiving lines RL21 and RL22. The first transmission lines TL11 and TL12, the second transmission lines TL21 and TL22, the first receiving lines RL11 and RL12, and the second receiving lines RL21 and RL22 may be located in the non-sensing region NSA.

The first transmission lines TL11 and TL12 may be electrically connected to the plurality of first transmission electrodes TE1, and the second transmission lines TL21 and TL22 may be electrically connected to the plurality of second transmission electrodes TE2. The first receiving lines RL11 and RL12 may be electrically connected to the plurality of first receiving electrodes RE1, and the second receiving lines RL21 and RL22 may be electrically connected to the plurality of second receiving electrodes RE2.

The plurality of first transmission electrodes TE1 and the plurality of first receiving electrodes RE1 may be electrically connected to the first readout circuit ROC1 (see FIG. 2) through the first transmission lines TL11 and TL12 and the first receiving lines RL11 and RL12. The first readout circuit ROC1 (see FIG. 2) may control the operation of the plurality of first transmission electrodes TE1 and the plurality of first receiving electrodes RE1.

The plurality of second transmission electrodes TE2 and the plurality of second receiving electrodes RE2 may be electrically connected to the second readout circuit ROC2 (see FIG. 2) through the second transmission lines TL21 and TL22 and the second receiving lines RL21 and RL22. The second readout circuit ROC2 (see FIG. 2) may control the operations of the plurality of second transmission electrodes TE2 and the plurality of second receiving electrodes RE2.

The first transmission lines TL11 and TL12 and the first receiving lines RL11 and RL12 of the sensor layer ISU may be electrically connected to the first readout circuit ROC1 (see FIG. 2) through the contact holes CNT, the auxiliary lines SSL (see FIG. 5) of the display layer DP (see FIG. 5), and the plurality of sensor pads IS-PD (see FIG. 5). However, the embodiments of the present disclosure are not limited thereto. According to some embodiments, the sensor layer ISU may include pads electrically connected to the first transmission lines TL11 and TL12 and the first receiving lines RL11 and RL12. In this case, the circuit board FCB (see FIG. 2) including the first readout circuit ROC1 (see FIG. 2) may be directly connected to the pads of the sensor layer ISU without passing through the display layer DP (see FIG. 5). The first readout circuit ROC1 (see FIG. 2) may transmit a transmission signal to the first transmission lines TL11 and TL12 and receive a receiving signal from the first receiving lines RL11 and RL12. The first readout circuit ROC1 (see FIG. 2) may calculate the coordinates of external inputs based on the receiving signal.

The second transmission lines TL21 and TL22 and the second receiving lines RL21 and RL22 of the sensor layer ISU may be electrically connected to the second readout circuit ROC2 (see FIG. 2) through the contact holes CNT, the auxiliary lines SSL (see FIG. 5) of the display layer DP (see FIG. 5), and the plurality of sensor pads IS-PD. However, the embodiments of the present disclosure are not limited thereto. According to some embodiments, the sensor layer ISU may include pads electrically connected to the second transmission lines TL21 and TL22 and the second receiving lines RL21 and RL22. In this case, the circuit board FCB (see FIG. 2) including the second readout circuit ROC2 (see FIG. 2) may be directly connected to the pads of the sensor layer ISU without passing through the display layer DP (see FIG. 5). The second readout circuit ROC2 (see FIG. 2) may transmit a transmission signal to the second transmission lines TL21 and TL22 and receive a receiving signal from the second receiving lines RL21 and RL22. The second readout circuit ROC2 (see FIG. 2) may calculate the coordinates of external inputs based on the receiving signal.

Figure 7:
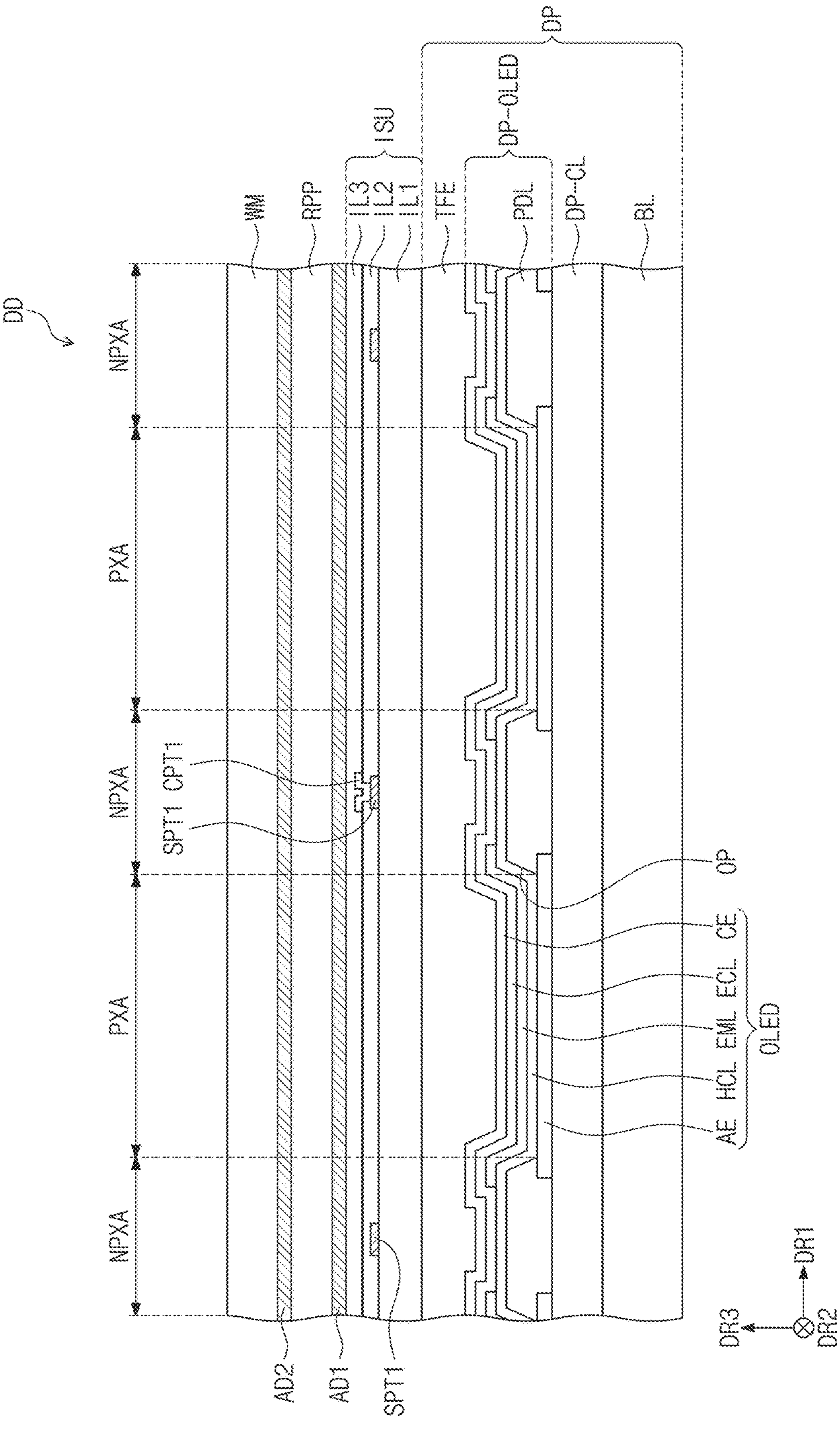
FIG. 7 is a cross-sectional view showing components of a display device according to some embodiments of the present disclosure.

FIG. 7 is a cross-sectional view of a display device according to some embodiments of the present disclosure. In describing FIG. 7, the same reference symbols are given to the components described through FIGS. 3 and 4, and duplicated descriptions thereof will not be provided.

Referring to FIG. 7, the display device DD may include a display layer DP, a sensor layer ISU, an anti-reflection panel RPP, and a window WM.

The display layer DP may include a base layer BL, a circuit element layer DP-CL, a light emitting element layer DP-OLED, and a thin film encapsulation layer TFE.

The base layer BL may include a synthetic resin film. A synthetic resin layer is formed on a working substrate used in preparing the display layer DPP. Thereafter, a conductive layer and an insulating layer are formed on the synthetic resin layer. When the working substrate is removed, the synthetic resin layer corresponds to the base layer BL. The synthetic resin layer may be a polyimide resin layer, and the material is not particularly limited. In addition, the base layer BL may include a glass substrate, a metal substrate, or an organic/inorganic composite material substrate.

The circuit element layer DP-CL may be located on the base layer BL. The circuit element layer DP-CL includes at least one insulating layer and a circuit element. Hereinafter, the insulating layer included in the circuit element layer DP-CL is referred to as an intermediate insulating layer. The intermediate insulating layer may include at least one intermediate inorganic film and/or at least one intermediate organic film. The circuit element may include signal lines, pixel driving circuits, and the like. The circuit element layer DP-CL may be formed through a process of forming an insulating layer, a semiconductor layer, and a conductive layer by coating, vapor deposition, and the like, and a process of patterning the insulating layer, the semiconductor layer, and the conductive layer by photolithography.

The light emitting element layer DP-OLED may be located on the circuit element layer DP-CL. The light emitting element layer DP-OLED may include a pixel defining film PDL and an organic light emitting diode OLED. The pixel defining film PDL may include an organic material.

The first electrode AE may be located on the circuit element layer DP-CL. The pixel defining film PDL may be formed on the first electrode AE. An opening OP is defined in the pixel defining film PDL. The opening OP of the pixel defining film PDL exposes at least a portion of the first electrode AE. According to some embodiments of the present disclosure, the pixel defining film PDL may not be provided.

A hole control layer HCL may be located on the first electrode AE. An emission layer EML may be located on the hole control layer HCL. The emission layer EML may be located in a region corresponding to the opening OP. That is, the emission layer EML may be separately formed in each of the pixels PX (see FIG. 5). The emission layer EML may include an organic material and/or an inorganic material. The emission layer EML may generate a colored light (e.g., a set or predetermined colored light).

An electron control layer ECL may be located on the emission layer EML. A second electrode CE may be located on the electron control layer ECL. The second electrode CE may be commonly arranged in the pixels PX.

The thin film encapsulation layer TFE may be located on the second electrode CE. The thin film encapsulation layer TFE may seal the light emitting element layer DP-OLED. The thin film encapsulation layer TFE may include at least one insulating layer. The thin film encapsulation layer TFE according to some embodiments of the present disclosure may include at least one inorganic film (hereinafter, an encapsulation inorganic film). The thin film encapsulation layer TFE according to some embodiments of the present disclosure may include at least one organic film (hereinafter, an encapsulation organic film) and at least one encapsulation inorganic film.

The encapsulation inorganic film may protect the light emitting element layer DP-OLED from moisture/oxygen, and the encapsulation organic film may protect the light emitting element layer DP-OLED from foreign substances such as dust particles. The encapsulation inorganic film may include a silicon nitride layer, a silicon oxy nitride layer, a silicon oxide layer, a titanium oxide layer, an aluminum oxide layer, and the like, but is not particularly limited thereto. The encapsulation organic film may include an acryl-based organic layer, but is not limited thereto.

The sensor layer ISU may include a base layer IL1, first and second conductive layers, and first and second insulating layers IL2 and IL3.

The base layer IL1 may include an inorganic material, for example, a silicon nitride layer. An inorganic film located on an uppermost side of the thin film encapsulation layer TFE may also include silicon nitride, and the silicon nitride layer and the base layer IL1 of the thin film encapsulation layer TFE may be formed in different deposition conditions.

The first conductive layer is located on the base layer IL1. The first conductive layer may include first connection patterns SPT1. The second conductive layer is located on the first conductive layer. The second conductive layer may include first transmission connection patterns CPT1. The first conductive layer IL2 is located between the first conductive layer and the second conductive layer. The first insulating layer IL2 separates the first conductive layer and the second conductive layer apart on a cross-section. A contact hole may be provided in the first insulating layer IL2 to partially expose the first transmission patterns SPT1, and the first transmission connection pattern CPT1 may be connected to the first transmission patterns SPT1 through the contact hole. The second insulating layer IL3 is located on the first insulating layer IL2. The second insulating layer IL3 may cover the second conductive layer. The second insulating layer IL3 protects the second conductive layer from external conditions.

Mesh lines of the first transmission connection pattern CPT1 may define a plurality of mesh holes. The mesh lines may have a three-layer structure of, for example, titanium/aluminum/titanium.

In the display device according to some embodiments of the present disclosure, the sensor layer ISU may be directly located on the display layer DP. Herein, being directly located or directly arranged indicates that an adhesive film is not located between the sensor layer ISU and the display layer DP. That is, the sensor layer ISU may be formed on the display layer DP through a roll-to-roll process. In this case, the sensor layer ISU may be indicated as an input detection layer.

The portion in which the first electrode AE and the emission layer EML are located may be referred to as a pixel region PXA. The pixel region PXA may be arranged to be spaced apart in each of the first direction DR1 and the second direction DR2. A non-pixel region NPAX may be located between the pixel regions PXA and may surround the pixel region PXA.

The anti-reflection panel RPP may be located on an upper surface of the sensor layer ISU. According to some embodiments of the present disclosure, an anti-reflection panel RPP may include a polarizing film. The anti-reflection panel RPP may further include a protection film and other functional films in addition to the polarizing film, but hereinafter, for convenience of description, only the polarizing film is shown. The adhesive member AD1 may be located between the anti-reflection panel RPP and the sensor layer ISU. Accordingly, the anti-reflection panel RPP may be bonded to the sensor layer ISU through the adhesive member AD1. The window WM may be bonded onto the anti-reflection panel RPP through the adhesive member AD2.

Figure 8:
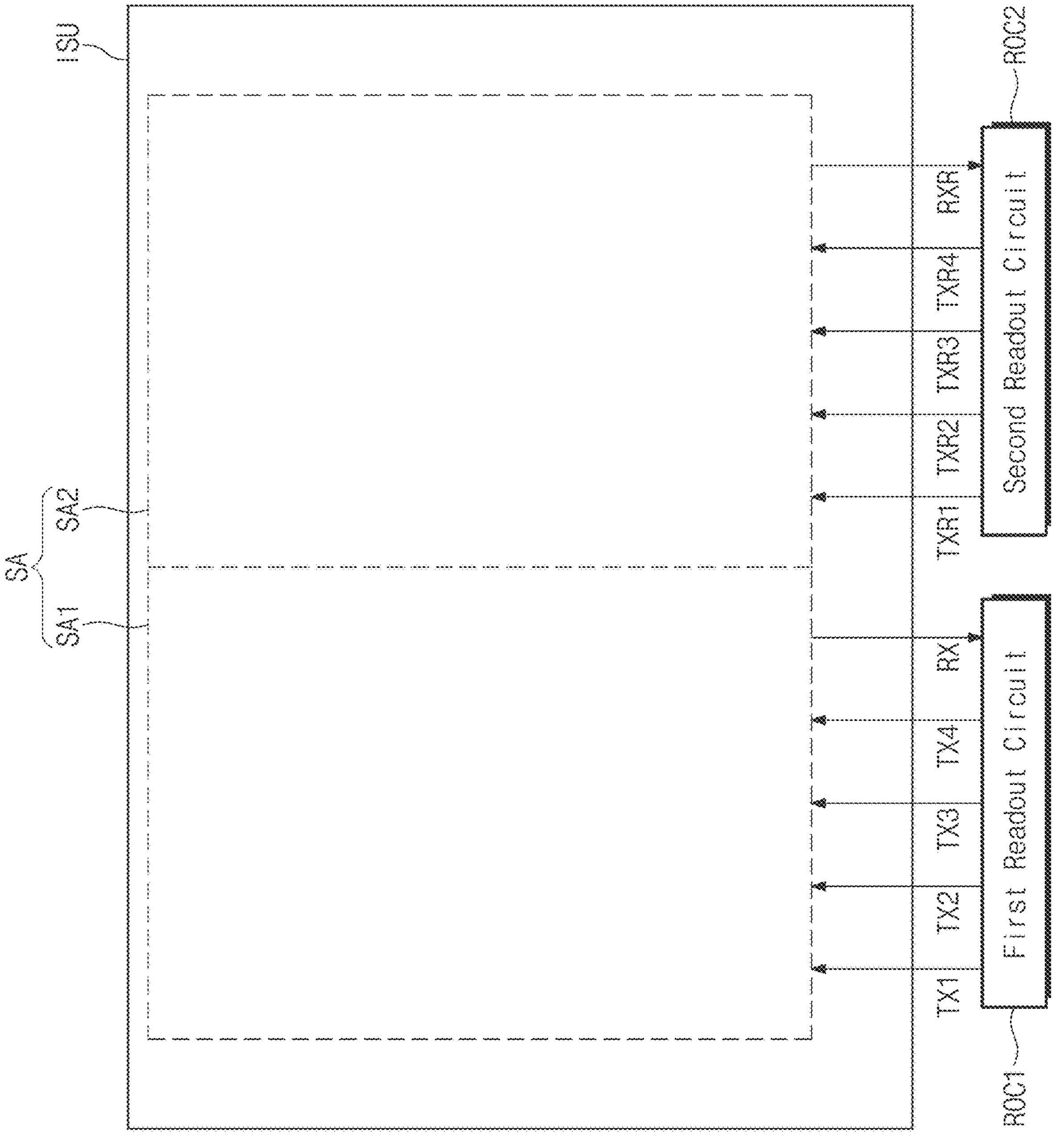
FIG. 8 is a view for describing the operation of a sensor layer, a first readout circuit, and a second readout circuit according to some embodiments of the present disclosure.
Figure 9:
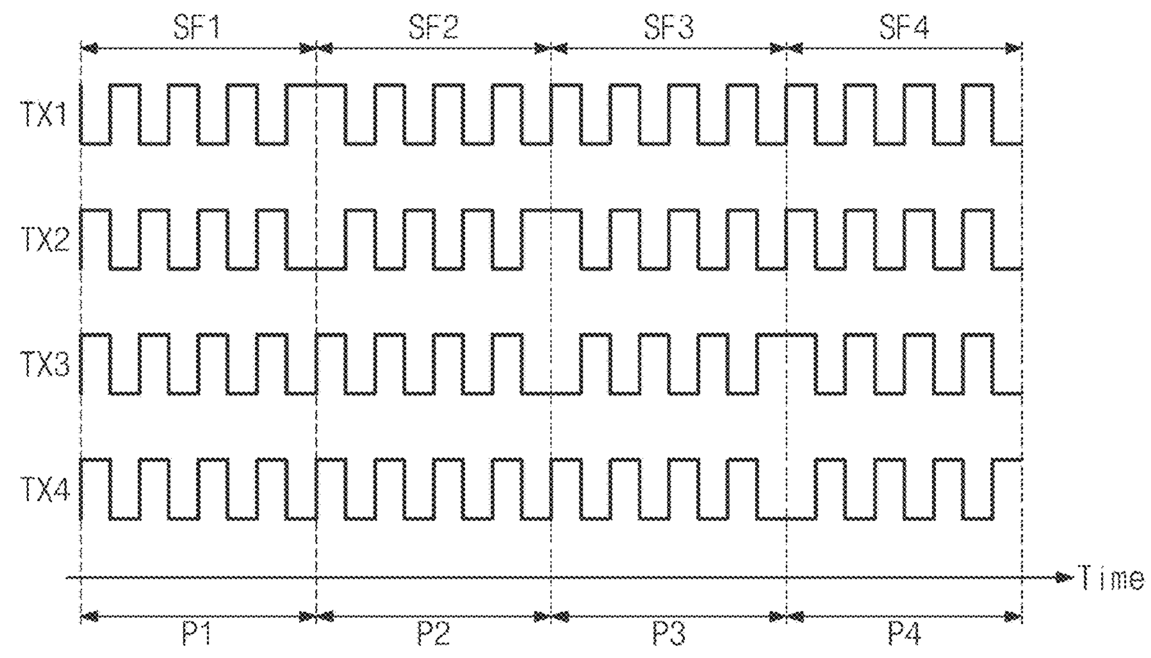
FIG. 9 is a timing chart showing a transmission signal provided to a first sensing region according to some embodiments of the present disclosure.
Figure 10:
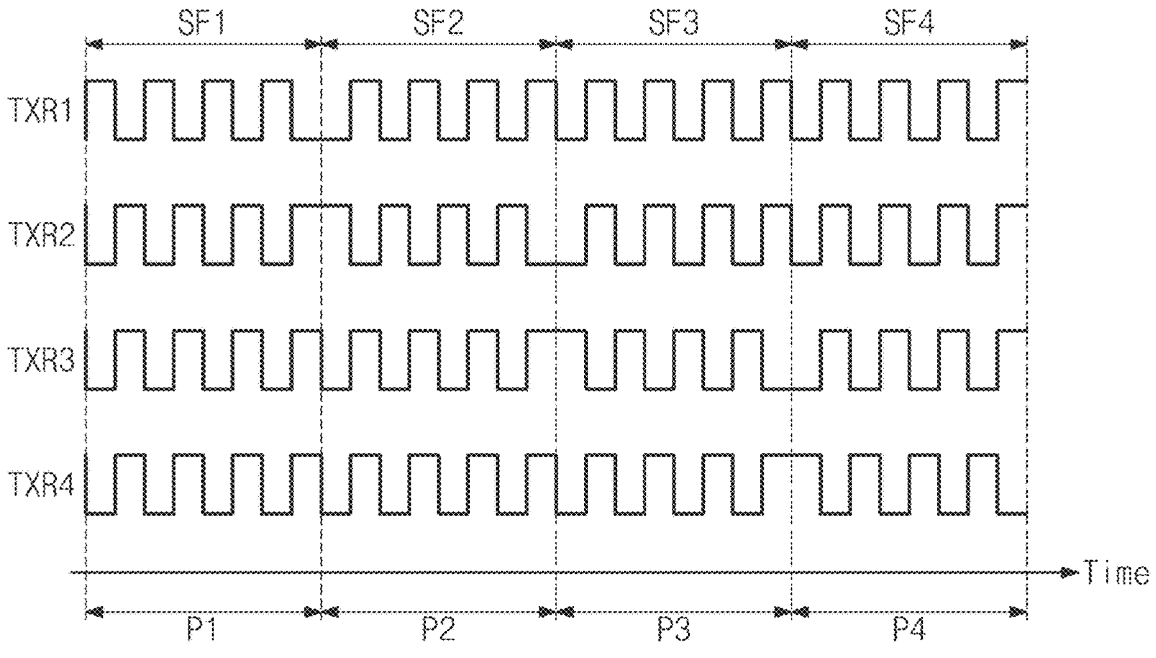
FIG. 10 is a timing chart showing a transmission signal provided to a second sensing region according to some embodiments of the present disclosure.

FIG. 8 is a view for describing the operation of a sensor layer, a first readout circuit, and a second readout circuit according to some embodiments of the present disclosure. FIG. 9 is a timing chart showing a transmission signal provided to a first sensing region according to some embodiments of the present disclosure. FIG. 10 is a timing chart showing a transmission signal provided to a second sensing region according to some embodiments of the present disclosure.

Referring to FIGS. 6, 8, 9, and 10, a first sensing region SA1 and a second sensing region SA2 may be defined in the sensor layer ISU. A plurality of first transmission electrodes TE1 and a plurality of first receiving electrodes RE1 may be located in the first sensing region SA1, and a plurality of second transmission electrodes TE2 and a plurality of second receiving electrodes RE2 may be located in the second sensing region SA2.

The first readout circuit ROC1 may concurrently provide first to fourth transmission signals TX1-TX4 to four adjacent first transmission electrodes TE1 among the plurality of first transmission electrodes TE1. However, this is presented as an example, and the number of transmission signals concurrently provided by the first readout circuit ROC1 according to some embodiments of the present disclosure is not limited to thereto. For example, the first readout circuit ROC1 may concurrently provide transmission signals to six adjacent first transmission electrodes TE1 among the plurality of first transmission electrodes TE1.

The first to fourth transmission signals TX1-TX4 may each be a square wave (or pulse wave). The first to fourth transmission signals TX1-TX4 may each have a waveform (e.g., a set or predetermined waveform).

In this case, the waveform of the transmission signal transmitted by the first readout circuit ROC1 to any one of the plurality of first transmission electrodes TE1 may be different from the waveform of the transmission signal transmitted to the others of the plurality of first transmission electrodes TE1.

The first to fourth transmission signals TX1-TX4 may include a first portion P1, a second portion P2, a third portion P3, and a fourth portion P4, which are consecutive.

The first portion P1 of the first transmission signal TX1 may have a first waveform. The second portion P2, the third portion P3, and the fourth portion P4 of the first transmission signal TX1 may have a second waveform. The second waveform may have a waveform that is inverse in phase to the first waveform. That is, the first waveform and the second waveform may have a phase difference of 180°.

The second portion P2 of the second transmission signal TX2 may have a first waveform. The first portion P1, the third portion P3, and the fourth portion P4 of the second transmission signal TX2 may have a second waveform.

The third portion P3 of the third transmission signal TX3 may have a first waveform. The first portion P1, the second portion P2, and the fourth portion P4 of the third transmission signal TX3 may have a second waveform.

The fourth portion P4 of the fourth transmission signal TX4 may have a first waveform. The first portion P1, the second portion P2, and the third portion P3 of the fourth transmission signal TX4 may have a second waveform.

The second readout circuit ROC2 may concurrently provide the fifth to eighth transmission signals TXR1-TXR4 to four adjacent second transmission electrodes TE2 among the plurality of second transmission electrodes TE2. However, this is presented as an example, and the number of transmission signals concurrently provided by the second readout circuit ROC2 according to some embodiments of the present disclosure is not limited to thereto. For example, the second readout circuit ROC2 may concurrently provide transmission signals to six adjacent second transmission electrodes TE2 among the plurality of second transmission electrodes TE2.

The fifth to eighth transmission signals TXR1-TXR4 may each be a square wave (or pulse wave). The fifth to eighth transmission signals TXR1-TXR4 may each have a waveform (e.g., a set or predetermined waveform).

In this case, the waveform of the transmission signal transmitted by the second readout circuit ROC2 to any one of the plurality of second transmission electrodes TE2 may be different from the waveform of the transmission signal transmitted to the others of the plurality of second transmission electrodes TE2.

The fifth to eighth transmission signals TXR1-TXR4 may include a first portion P1, a second portion P2, a third portion P3, and a fourth portion P4, which are consecutive.

The first portion P1 of the fifth transmission signal TXR1 may have a second waveform. The second portion P2, the third portion P3, and the fourth portion P4 of the fifth transmission signal TXR1 may have a first waveform.

The second portion P2 of the sixth transmission signal TXR2 may have a second waveform. The first portion P1, the third portion P3, and the fourth portion P4 of the sixth transmission signal TXR2 may have a first waveform.

The third portion P3 of the seventh transmission signal TXR3 may have a second waveform. The first portion P1, the second portion P2, and the fourth portion P4 of the seventh transmission signal TXR3 may have a first waveform.

The fourth portion P4 of the eighth transmission signal TXR4 may have a second waveform. The first portion P1, the second portion P2, and the third portion P3 of the eighth transmission signal TXR4 may have a first waveform.

The fifth to eighth transmission signals TXR1-TXR4 provided to the plurality of second transmission electrodes TE2 may be concurrently provided to the first to fourth transmission signals TX1-TX4 provided to the plurality of first transmission electrodes TE1.

The first readout circuit ROC1 and the second readout circuit ROC2 may operate the sensor layer ISU in units of sensing frames SF1, SF2, SF3, and SF4. For example, the sensor layer ISU may continue to work during the first sensing frame SF1, the second sensing frame SF2, the third sensing frame SF3, and the fourth sensing frame SF4.

During the first sensing frame SF1, the first portion P1 of the first transmission signal TX1, the first portion P1 of the second transmission signal TX2, the first portion P1 of the third transmission signal TX3, and the first portion P1 of the fourth transmission signal TX4 may be provided to four adjacent first transmission electrodes TE1 among the plurality of first transmission electrodes TE1.

During the second sensing frame SF2, the second portion P2 of the first transmission signal TX1, the second portion P2 of the second transmission signal TX2, the second portion P2 of the third transmission signal TX3, and the second portion P2 of the fourth transmission signal TX4 may be provided to four adjacent first transmission electrodes TE1 among the plurality of first transmission electrodes TE1.

During the third sensing frame SF3, the third portion P3 of the first transmission signal TX1, the third portion P3 of the second transmission signal TX2, the third portion P3 of the third transmission signal TX3, and the third portion P3 of the fourth transmission signal TX4 may be provided to four adjacent first transmission electrodes TE1 among the plurality of first transmission electrodes TE1.

During the fourth sensing frame SF4, the fourth portion P4 of the first transmission signal TX1, the fourth portion P4 of the second transmission signal TX2, the fourth portion P4 of the third transmission signal TX3, and the fourth portion P4 of the fourth transmission signal TX4 may be provided to four adjacent first transmission electrodes TE1 among the plurality of first transmission electrodes TE1.

That is, in each of the first to fourth sensing frames SF1-SF4, at least one of the first to fourth transmission signals TX1-TX4 may have a phase difference from the other transmission signals. Accordingly, even when the first readout circuit ROC1 concurrently transmits the first to fourth transmission signals TX1-TX4 to the plurality of first transmission electrodes TE1, changes in capacitance of capacitors each formed between the plurality of first transmission electrodes TE1 and the plurality of first receiving electrodes RE1 may be readily sensed.

The plurality of first receiving electrodes RE1 may output the first receiving signal RX in response to the first to fourth transmission signals TX1-TX4. The first receiving signal RX may include the changes in capacitance. The first readout circuit ROC1 may detect external inputs by receiving the first receiving signal RX.

The first readout circuit ROC1 may work in a multi-channel driving (MCD) mode concurrently transmitting transmission signals to k first transmission electrodes TE1 among the plurality of first transmission electrodes TE1 instead of an individual driving mode sequentially transmitting transmission signals to each of the plurality of first transmission electrodes TE1. In this case, k may be an integer of 2 or greater.

According to some embodiments of the present disclosure, the first to fourth transmission signals TX1-TX4 may be concurrently provided to the plurality of first transmission electrodes TE1, and the plurality of first receiving electrodes RE1 may output the first receiving signal RX in response to the first to fourth transmission signals TX1-TX4. The size of the first receiving signal RX may be increased by concurrently providing the first to fourth transmission signals TX1-TX4 to the plurality of first transmission electrodes TE1. Greater sensitivity may be achieved by increasing the signal to noise ratio (SNR) of the sensor layer ISU and the first readout circuit ROC1. Accordingly, the display device DD (see FIG. 1) having relatively improved detection reliability may be provided.

During the first sensing frame SF1, the first portion P1 of the fifth transmission signal TXR1, the first portion P1 of the sixth transmission signal TXR2, the first portion P1 of the seventh transmission signal TXR3, and the first portion P1 of the eighth transmission signal TXR4 may be provided to four adjacent second transmission electrodes TE2 among the plurality of second transmission electrodes TE2.

During the second sensing frame SF2, the second portion P2 of the fifth transmission signal TXR1, the second portion P2 of the sixth transmission signal TXR2, the second portion P2 of the seventh transmission signal TXR3, and the second portion P2 of the eighth transmission signal TXR4 may be provided to four adjacent second transmission electrodes TE2 among the plurality of second transmission electrodes TE2.

During the third sensing frame SF3, the third portion P3 of the fifth transmission signal TXR1, the third portion P3 of the sixth transmission signal TXR2, the third portion P3 of the seventh transmission signal TXR3, and the third portion P3 of the eighth transmission signal TXR4 may be provided to four adjacent second transmission electrodes TE2 among the plurality of second transmission electrodes TE2.

During the fourth sensing frame SF4, the fourth portion P4 of the fifth transmission signal TXR1, the fourth portion P4 of the sixth transmission signal TXR2, the fourth portion P4 of the seventh transmission signal TXR3, and the fourth portion P4 of the eighth transmission signal TXR4 may be provided to four adjacent second transmission electrodes TE2 among the plurality of second transmission electrodes TE2.

That is, in each of the first to fourth sensing frames SF1-SF4, at least one of the fifth to eighth transmission signals TXR1-TXR4 may have a phase difference from the other transmission signals. Accordingly, even when the second readout circuit ROC2 concurrently transmits the fifth to eighth transmission signals TXR1-TXR4 to the plurality of second transmission electrodes TE2, changes in capacitance of capacitors each formed between the plurality of second transmission electrodes TE2 and the plurality of second receiving electrodes RE2 may be readily sensed.

The plurality of second receiving electrodes RE2 may output a second receiving signal RXR in response to the fifth to eighth transmission signals TXR1-TXR4. The second receiving signal RXR may include the changes in capacitance. The second readout circuit ROC2 may detect external inputs by receiving the second receiving signal RXR.

The second readout circuit ROC2 may work in a multi-channel driving (MCD) mode concurrently transmitting transmission signals to k second transmission electrodes TE2 among the plurality of second transmission electrodes TE2 instead of an individual driving mode sequentially transmitting transmission signals to each of the plurality of second transmission electrodes TE2.

According to some embodiments of the present disclosure, the fifth to eighth transmission signals TXR1-TXR4 may be concurrently provided to the plurality of second transmission electrodes TE2, and the plurality of second receiving electrodes RE2 may output the second receiving signal RXR in response to the fifth to eighth transmission signals TXR1-TXR4. The size of the second receiving signal RXR may be increased by concurrently providing the fifth to eighth transmission signals TXR1-TXR4 to the plurality of second transmission electrodes TE2. Greater sensitivity may be achieved by increasing the signal to noise ratio (SNR) of the sensor layer ISU and the second readout circuit ROC2. Accordingly, the display device DD (see FIG. 1) having relatively improved detection reliability may be provided.

Unlike what is shown according to embodiments of the present disclosure, when the first signal provided to the first sensing region SA1 and the second signal provided to the second sensing region SA2 are not inverse in phase, the first signal and the second signal may be reinforced to cause interference between the signal of the sensor layer ISU and the signal provided to the display layer DP (see FIG. 5). Accordingly, the signal may affect the image quality of images displayed by the display layer DP (see FIG. 5). In this case, a display device may have relatively reduced display quality. In addition, the signal of the sensor layer ISU may cause electromagnetic interference (EMI) with other components. As described above, the first transmission signal TX1 having a first waveform, the second transmission signal TX2 having a second waveform, the third transmission signal TX3 having a second waveform, and the fourth transmission signal TX4 having a second waveform may be provided to the plurality of first transmission electrodes TE1 during the first sensing frame SF1, and the fifth transmission signal TXR1 having a second waveform, the sixth transmission signal TXR2 having a first waveform, the seventh transmission signal TXR3 having a first waveform, and the eighth transmission signal TXR4 having a first waveform may be provided to the plurality of second transmission electrodes TE2. That is, signals provided to the first sensing region SA1 and signals provided to the second sensing region SA2 may be inverse in phase to each other. Accordingly, the signals provided to the first sensing region SA1 and the signals provided to the second sensing region SA2 cancel each other, thereby relatively reducing or eliminating interference between the display layer DP (see FIG. 5) and the sensor layer ISU. Accordingly, image quality degradation may be relatively reduced, and thus the display device DD (see FIG. 1) having relatively improved display quality may be obtained.

As described above, a first transmission signal having a first waveform, a second transmission signal having a second waveform, a third transmission signal having a second waveform, and a fourth transmission signal having a second waveform may be provided to a plurality of first transmission electrodes during a first sensing frame, and a fifth transmission signal having a second waveform, a sixth transmission signal having a first waveform, a seventh transmission signal having a first waveform, and an eighth transmission signal having a first waveform may be provided to a plurality of second transmission electrodes. That is, signals provided to a first sensing region and signals provided to a second sensing region may be inverse in phase to each other. Accordingly, the signals provided to the first sensing region and the signals provided to the second sensing region cancel each other, thereby relatively reducing or eliminating interference between a display layer and a sensor layer. Accordingly, image quality degradation may be relatively reduced, and thus a display device having relatively improved display quality may be obtained.

Although aspects of some embodiments of the present disclosure have been described with reference to some embodiments according to the present disclosure, it will be understood that embodiments according to the present disclosure should not be limited to these disclosed embodiments but various changes and modifications may be made by those skilled in the art without departing from the spirit and scope of embodiments according to the present disclosure. Accordingly, the technical scope of embodiments according to the present disclosure are not intended to be limited to the contents set forth in the detailed description of the specification, but is intended to be defined by the appended claims, and their equivalents.

What is claimed is:

1. A display device comprising:

a display layer; and a sensor layer on the display layer and having a sensing region including a first sensing region and a second sensing region adjacent to the first sensing region, wherein the sensor layer comprises:

a plurality of first transmission electrodes, each extending in a first direction, spaced apart in a second direction crossing the first direction, and located in the first sensing region; and a plurality of second transmission electrodes, each extending in the first direction, spaced apart in the second direction, and located in the second sensing region, a first one of the plurality of first transmission electrodes is configured to receive a first transmission signal having a first waveform in a first sensing frame and having a second waveform that is inverse in phase to the first waveform in a second sensing frame continuous with the first sensing frame, a second one of the first transmission electrodes adjacent to the first one of the plurality of first transmission electrodes is configured to receive a second transmission signal having the second waveform that is inverse in phase to the first waveform in the first sensing frame and having the first waveform in the second sensing frame, a third one of the first transmission electrodes adjacent to the second one of the plurality of first transmission electrodes is configured to receive a third transmission signal having the second waveform in the first sensing frame and having the second waveform in the second sensing frame, a fourth one of the first transmission electrodes adjacent to the third one of the plurality of first transmission electrodes is configured to receive a fourth transmission signal having the second waveform in the first sensing frame and having the second waveform in the second sensing frame, one of the plurality of second transmission electrodes is configured to receive a fifth transmission signal having the second waveform in the first sensing frame and having the first waveform in the second sensing frame, another one adjacent to the one of the plurality of second transmission electrodes is configured to receive a sixth transmission signal having the first waveform in the first sensing frame and having the second waveform in the second sensing frame, and the first to sixth transmission signals are provided concurrently.

2. The display device of claim 1, wherein the second sensing region is spaced apart from the first sensing region in the second direction.

3. The display device of claim 1, wherein the sensor layer comprises:

a plurality of first receiving electrodes, each extending in the second direction, spaced apart in the first direction, and located in the first sensing region; and a plurality of second receiving electrodes, each extending in the second direction, spaced apart in the first direction, and located in the second sensing region.

4. The display device of claim 3, wherein the plurality of first receiving electrodes are electrically insulated from the plurality of second receiving electrodes.

5. The display device of claim 3, wherein the plurality of first receiving electrodes are configured to output a first receiving signal in response to the first transmission signal, the second transmission signal, the third transmission signal, and the fourth transmission signal, and the plurality of second receiving electrodes are configured to output a second receiving signal in response to the fifth transmission signal and the sixth transmission signal.

6. The display device of claim 5, further comprising a readout circuit driving the sensor layer, wherein the readout circuit comprises a first readout circuit electrically connected to the plurality of first transmission electrodes and a second readout circuit electrically connected to the plurality of second transmission electrodes.

7. The display device of claim 6, wherein the first readout circuit is configured to provide the first transmission signal, the second transmission signal, the third transmission signal, and the fourth transmission signal to the plurality of first transmission electrodes, and the second readout circuit is configured to provide the fifth transmission signal and the sixth transmission signal to the plurality of second transmission electrodes.

8. The display device of claim 6, wherein the first readout circuit is configured to receive the first receiving signal from the plurality of first receiving electrodes, and the second readout circuit is configured to receive the second receiving signal from the plurality of second receiving electrodes.

9. The display device of claim 1, wherein an active region is defined in the display layer, the first sensing region overlaps a portion of the active region, and the second sensing region overlaps a remaining portion of the active region.

10. The display device of claim 1, wherein the fifth transmission signal, the sixth transmission signal, a seventh transmission signal, and an eighth transmission signal are each concurrently provided to four adjacent second transmission electrodes among the plurality of second transmission electrodes, the fifth to eighth transmission signals are provided concurrently with the first to fourth transmission signals.

11. A display device comprising:

a display layer; and a sensor layer on the display layer, having a sensing region including a first sensing region and a second sensing region adjacent to the first sensing region, and configured to work on a first sensing frame and a second sensing frame continuous with the first sensing frame, wherein the sensor layer comprises:

a plurality of first transmission electrodes, each extending in a first direction, spaced apart in a second direction crossing the first direction, and located in the first sensing region; and a plurality of second transmission electrodes, each extending in the first direction, spaced apart in the second direction, and located in the second sensing region, each of first transmission electrodes adjacent to each other among the plurality of first transmission electrodes is configured to receive a corresponding one of a plurality of first transmission signals, each of second transmission electrodes adjacent to each other among the plurality of second transmission electrodes is configured to receive a corresponding one of a plurality of second transmission signals, one of the plurality of first transmission signals has a first waveform during the first sensing frame and at least three of remaining ones of the plurality of first transmission signals have a second waveform different from the first waveform during the first sensing frame, one of the plurality of second transmission signals has the second waveform during the first sensing frame and at least three of remaining ones of the plurality of second transmission signals have the first waveform during the first sensing frame, another one adjacent to the one of the plurality of first transmission signals has the first waveform during the second sensing frame and has the second waveform during the first sensing frame and at least three of remaining ones including the one of the plurality of first transmission signals have the second waveform during the second sensing frame, another one adjacent to the one of the plurality of second transmission signals has the second waveform during the second sensing frame and has the first waveform during the first sensing frame and at least three of remaining ones including the one of the plurality of second transmission signals have the first waveform during the second sensing frame.

12. The display device of claim 11, wherein the second sensing region is spaced apart from the first sensing region in the second direction.

13. The display device of claim 11, wherein the sensor layer comprises:

a plurality of first receiving electrodes, each extending in the second direction, spaced apart in the first direction, and located in the first sensing region; and a plurality of second receiving electrodes, each extending in the second direction, spaced apart in the first direction, and located in the second sensing region.

14. The display device of claim 13, wherein the plurality of first receiving electrodes are electrically insulated from the plurality of second receiving electrodes.

15. The display device of claim 11, further comprising a readout circuit driving the sensor layer, wherein the readout circuit comprises a first readout circuit electrically connected to the plurality of first transmission electrodes and a second readout circuit electrically connected to the plurality of second transmission electrodes.

16. The display device of claim 15, wherein the first readout circuit is configured to provide the first transmission signal to the plurality of first transmission electrodes, and the second readout circuit is configured to provide the second transmission signal to the plurality of second transmission electrodes.

17. The display device of claim 11, wherein a display region is defined in the display layer, the first sensing region overlaps a portion of the display region, and the second sensing region overlaps a remaining portion of the display region.

* * * * *